(12) United States Patent
Justin et al.

(10) Patent No.: US 12,604,127 B2
(45) Date of Patent: Apr. 14, 2026

(54) INFORMATION HANDLING SYSTEM HEADSET WITH ADJUSTABLE HEADBAND TENSIONER

(71) Applicant: Dell Products L.P., Round Rock, TX (US)

(72) Inventors: Wong Hin Loong Justin, Singapore (SG); Karthikeyan Krishnakumar, Austin, TX (US); Boon Kwang Koh, Singapore (SG)

(73) Assignee: Dell Products L.P., Round Rock, TX (US)

( * ) Notice: Subject to any disclaimer, the term of this patent is extended or adjusted under 35 U.S.C. 154(b) by 275 days.

(21) Appl. No.: 17/869,828

(22) Filed: Jul. 21, 2022

(65) Prior Publication Data

US 2024/0031715 A1 Jan. 25, 2024

(51) Int. Cl.
| *H04R 1/10* | (2006.01) |
| *G02B 27/01* | (2006.01) |
| *H04R 5/033* | (2006.01) |

(52) U.S. Cl.
CPC ....... *H04R 1/1008* (2013.01); *G02B 27/0176* (2013.01); *H04R 1/1066* (2013.01); *H04R 5/0335* (2013.01)

(58) Field of Classification Search
CPC .. H04R 5/0335; H04R 1/1066; H04R 1/1008; G02B 27/0176
See application file for complete search history.

(56) References Cited

U.S. PATENT DOCUMENTS

| | | | | |
|---|---|---|---|---|
| 1,546,567 A * | 7/1925 | Childress | ............. | H04R 1/1066 |
| | | | | 381/377 |
| 1,552,593 A * | 9/1925 | Childress | ............. | H04R 5/0335 |
| | | | | 381/379 |
| 4,727,585 A * | 2/1988 | Flygstad | ............. | H04R 5/0335 |
| | | | | 2/209 |
| 8,050,444 B2 | 11/2011 | Smith | | |
| 11,838,716 B1 * | 12/2023 | Helbert | ................ | A61B 5/0295 |
| 2004/0213428 A1 * | 10/2004 | Lenhard-Backhaus | ..................... | |
| | | | | H04R 1/1066 |
| | | | | 381/370 |
| 2004/0226146 A1 * | 11/2004 | Chen-Lieh | ............. | A44B 11/06 |
| | | | | 24/168 |
| 2010/0046782 A1 * | 2/2010 | Ito | ........................ | H04R 5/0335 |
| | | | | 381/378 |
| 2012/0099754 A1 * | 4/2012 | Petersen | ............. | H04R 1/1066 |
| | | | | 381/379 |
| 2012/0140974 A1 * | 6/2012 | Danielson | ............ | H04R 1/1066 |
| | | | | 381/379 |

(Continued)

FOREIGN PATENT DOCUMENTS

WO WO-2018072305 A1 * 4/2018 ......... G02B 27/0176

*Primary Examiner* — Carolyn R Edwards
*Assistant Examiner* — Kuassi A Ganmavo
(74) *Attorney, Agent, or Firm* — Zagorin Cave LLP; Robert W. Holland

(57) ABSTRACT

A headset presents audio sounds with first and second speakers disposed in first and second earcups that fit over first and second of an end user's ears in an earcup orientation. A headband that couples to the earcups through straps adjusts the width between the earcups by extending and retracting the straps normal the orientation earcup orientation. In one embodiment, a rack and pinion assembly in the headband synchronizes strap movement to manage a balanced headset fit.

20 Claims, 10 Drawing Sheets

(56) References Cited

U.S. PATENT DOCUMENTS

| | | | | |
|---|---|---|---|---|
| 2013/0260737 A1* | 10/2013 | Sampat | ............... | G06F 9/44526 |
| | | | | 455/418 |
| 2014/0023222 A1* | 1/2014 | Ito | ......................... | H04R 1/105 |
| | | | | 381/379 |
| 2015/0024804 A1* | 1/2015 | Davis | ................ | H04M 1/72427 |
| | | | | 455/569.1 |
| 2015/0139473 A1 | 5/2015 | Jaynes | | |
| 2016/0021446 A1* | 1/2016 | Litovsky | .............. | H04R 1/2857 |
| | | | | 381/338 |
| 2017/0264984 A1* | 9/2017 | Pelland | ................ | H04R 5/0335 |
| 2018/0152213 A1* | 5/2018 | Lee | ...................... | H04R 5/0335 |
| 2018/0302703 A1* | 10/2018 | Andrikowich | ....... | H04R 1/1016 |
| 2019/0320255 A1* | 10/2019 | Cranfield | ............... | H04R 1/105 |
| 2020/0029146 A1* | 1/2020 | Kamimura | ........... | H04R 1/1008 |
| 2020/0314530 A1 | 10/2020 | Chu et al. | | |
| 2021/0136476 A1* | 5/2021 | Liu | ...................... | H04R 5/0335 |
| 2023/0044893 A1* | 2/2023 | Xie | ...................... | H04R 1/1058 |

* cited by examiner

26

42

42

38

40

38

32

36

36

32

34

INFORMATION HANDLING SYSTEM HEADSET WITH ADJUSTABLE HEADBAND TENSIONER

BACKGROUND OF THE INVENTION

Field of the Invention

The present invention relates in general to the field of information handling system audio presentation, and more particularly to an information handling system headset with adjustable headband tensioner.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems process information with processing components disposed in a housing and present the information to an end user, such as with audiovisual presentation. Desktop information handling systems typically operate at a fixed location in cooperation with peripheral devices that interface through cable and wireless communications, such as a keyboard, a mouse, a display, speakers, a microphone and a headset. Portable information handling systems integrate processing components, a display and a power source in a portable housing to support mobile operations and can also interface with peripheral devices like a desktop system. Portable information handling systems allow end users to carry a system between meetings, during travel, and between home and office locations so that an end user has access to processing capabilities while mobile. When using either a desktop or portable information handling system, end users will often wear a headset to listen to audio output and to speak into a microphone included with the headset. The headset helps to keep conversations private by playing audio directly into an end user's ear and by the end user talking into a microphone near the end user's mouth. In addition, the headset provides improved audio with stereo played directly to each ear and, in some instances, noise cancellation.

Generally, a headset having earcups that enclose a speaker against an end user's head provide a good audio experience by blocking out external noise, yet, the pressing of an ear cup against an end user head can create some discomfort when a headset is worn for an extended time period. A typical headset have a single metal or plastic head band that fits around the skull to hold the earcups in place. Generally, the headband flexes to adapt to a range of head sizes and wearing preferences, however, a very wide range of sizes can make headset fit a challenge, such as a distance between ears of 97 to 155 mm. Individuals on the periphery of the design range can experience a high clamping force or an insecure attachment of the headset when in position. Another difficulty that can arise is an uneven clamping force due to a nonparallel positioning of a headset earcup on the end user's head due to insufficient or excessive angular tilt of the earcup relative to the end user's head. This uneven clamping force can result in an unsecure sealing of the earcup that allows external sound to enter and detracts from the end user listening experience.

SUMMARY OF THE INVENTION

Therefore, a need has arisen for a system and method which adjusts headset earcup spacing and orientation when fit on a human head.

In accordance with the present invention, a system and method are provided which substantially reduce the disadvantages and problems associated with previous methods and systems that adjust headset fit on a human head. A headband adjusts the width between headset earcups by extending and retracting straps normal the earcup orientation to achieve a comfortable and secure headset fit.

More specifically, an information handling system includes processing components that cooperate to process information, such as a processor and memory that cooperate to execute instructions that generate audio information. The audio information is communicated to a headset having first and second speakers in first and second earcups for presentation as audible sound in each of an end user's ears, such as stereo sound. The earcups press against an end user's head over the end user's ears at an earcup orientation with pressure applied by a headband coupled to the earcups with straps. The headband is configured to adjust the width between the earcups by extending and retracting straps substantially normal the earcup orientation. In one example embodiment, a rack and pinion mechanism provides synchronous adjustment of the straps and a latch engages a catch release to selectively engage the rack and pinion mechanism in desired positions. The latch has a beveled side that releases to permit tightening of the headband and a normal side that releases in response to a button push to loosen the headband.

The present invention provides a number of important technical advantages. One example of an important technical advantage is that a headset adapts width between earcups to provide a comfortable fit for an end user with a headband that engages the earcups with straps that extend and retract normal the earcup orientation. For instance, a rack and pinion mechanism synchronizes the strap extension and retraction to provide a comfortable headset fit and secure earcup seal.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system headset adjusts earcup width to provide a comfortable fit and earcup seal at end user ears for presentation of audible information as sounds. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
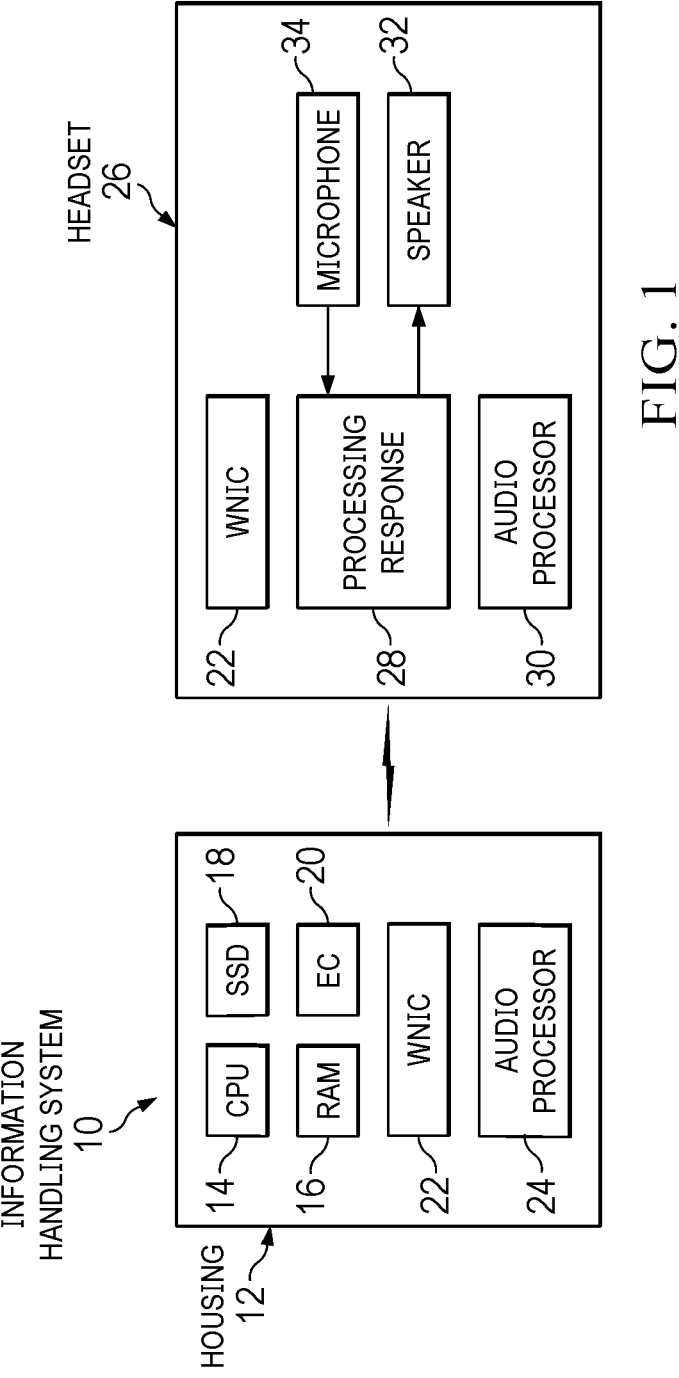
FIG. 1 depicts a block diagram of an information handling system having a headset that presents audio to an end user.

Referring now to FIG. 1, a block diagram depicts an information handling system 10 having a headset 26 that presents audio to an end user. In the example embodiment, information handling system 10 has a stationary housing 12, such as a desktop system, that houses processing components that cooperate to process information. In alternative embodiments, portable information handling systems having a portable housing may be used, such as tablets, laptops and/or convertible systems. A central processing unit (CPU) 14 executes instruction to process information in cooperation with a random access memory (RAM) 16 that stores the instructions and information. A solid state drive (SSD) 18 provides persistent storage of instructions and information, such as a operating system and applications that are retrieved at power up to RAM 16 for execution on CPU 14. An embedded controller 20 manages operation of the processing component, such as application of power and interactions with peripheral devices USB and other cable interfaces. A wireless network interface controller (WNIC) supports wireless communications with external networks and peripheral devices, such as with WiFi and BLUETOOTH. An audio processor 24 interfaces with CPU 14 to process information for presentation as audible sounds. In the example embodiment, WNIC 22 communicates audio information to a headset 26 for presentation as audible sounds. A WNIC 22 on headset 26 receives the audio information under the management of a processing resource 28 and in cooperation with an audio processor 30 plays the audio information as audible sound at speakers 32. A microphone 34 of headset 26 captures audible sounds and communicates the audible sounds to information handling system 10, such as speech of an end user in support of a telephone or video conference.

Figure 2:
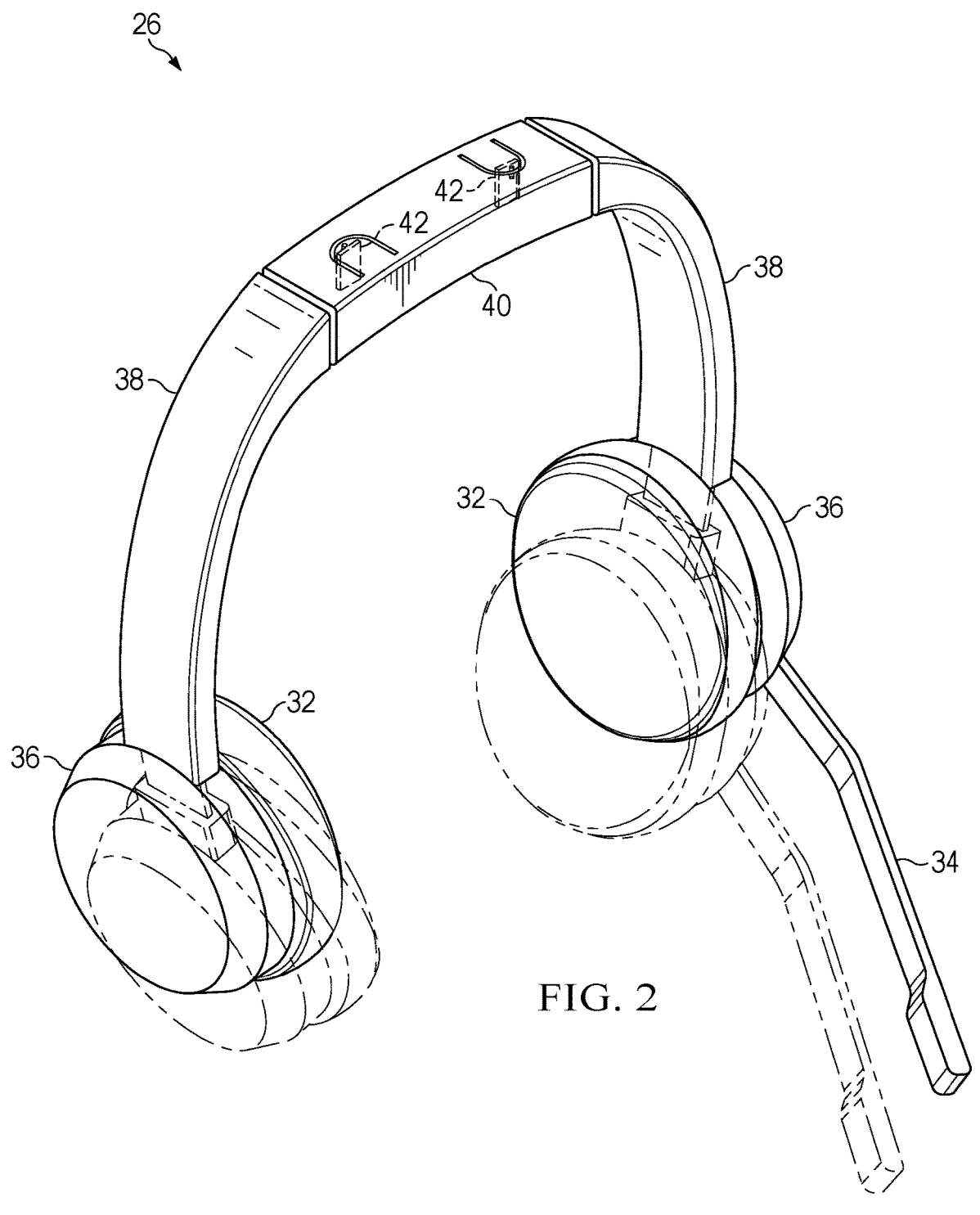
FIG. 2 depicts a side perspective view of a headset configured to adjust a width between earcups having speakers that present audio information as sounds to end user ears.

Referring now to FIG. 2, a side perspective view depicts a headset 26 configured to adjust a width between earcups 36 having speakers 32 that present audio information as sounds to end user ears. In the example embodiment, headset 26 has opposing earcups 36 that adjust in width by an extension and retraction of a headband 42 normal to the plane of orientation of earcups 36 and that adjust in height within the plane of orientation. A strap assembly 38 on each side of headband 40 provides structure to hold earcups 36 in position and end user ears with the position configurable by straps disposed within strap assembly 38. Buttons 42 exposed at the upper surface of headband 40 press inward to release the straps to extend and thereby increase the width between earcups 36. In the example embodiment, the width displaces by a range of 10 mm in steps of 2 mm increments. Buttons 42 are pressed to extend the width, however, in the example embodiment an inward press towards headband 40 overcomes the internal locking mechanism to retract the straps and reduce the width. As is shown in greater detail below with respect to FIGS. 3A, 3B and 4, a compression spring within the headband provides a bias to push apart the earcups when buttons 42 are pressed so that an end user does not have to pull outward to increase the earcup width. A latch and release within the headband release the bias when buttons 42 are pressed to allow the spring outward bias to increase the earcup width. Buttons 42 have a resilient material so that when the end user lets go of the button the latch and release engage to prevent the compression spring bias from increasing the earcup width. The latch and release have a beveled engagement so that a firm press inward on the headband will decrease the headband width without a necessity of pressing the buttons 42. In the example embodiment, buttons 42 need to be pressed only to widen the width of the earcup, reducing the width of the earcups does not require pressing of buttons 42.

Figure 3A:
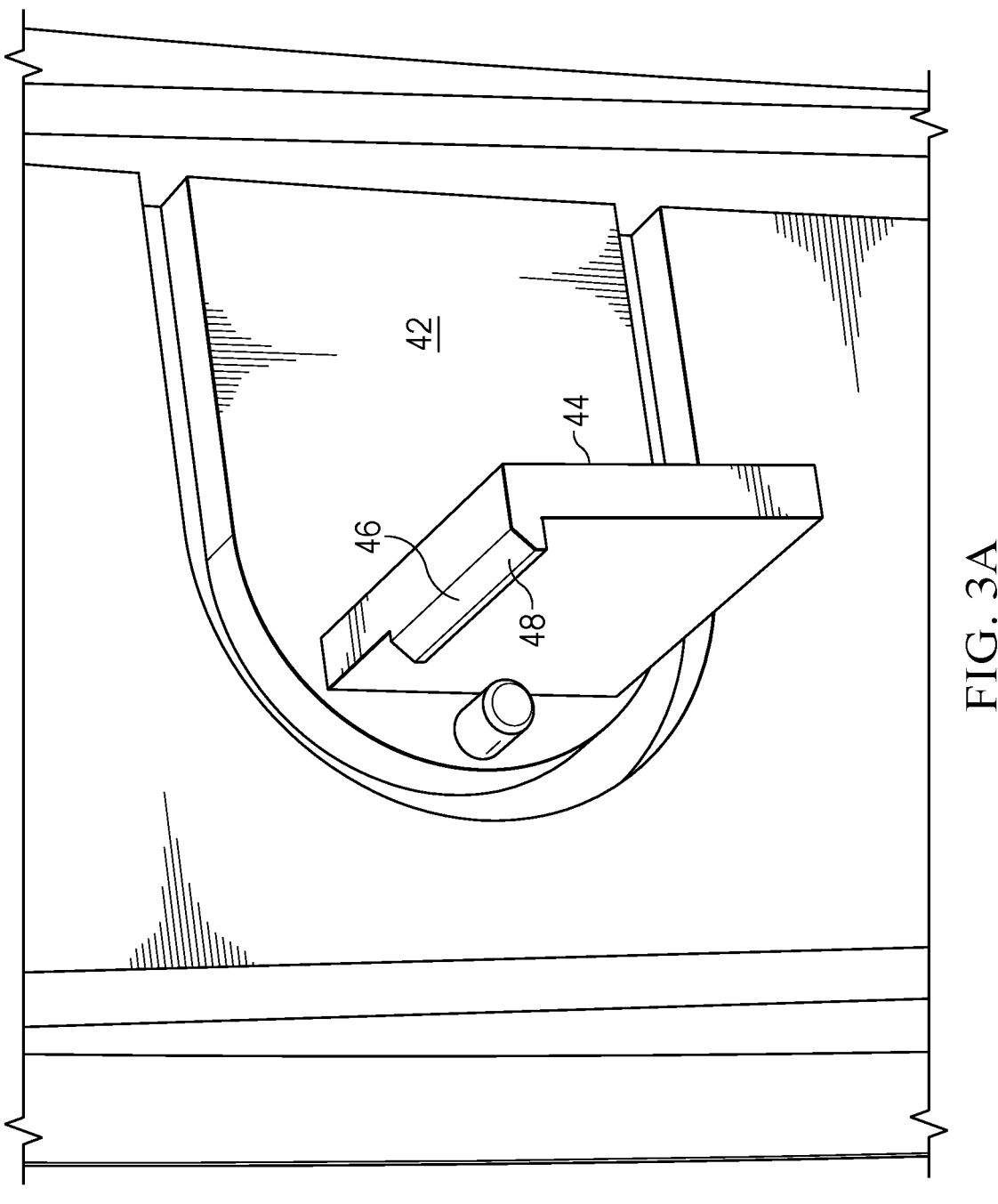
FIGS. 3A and 3B depict a latch and catch release configured to manage headband position settings.
Figure 3B:
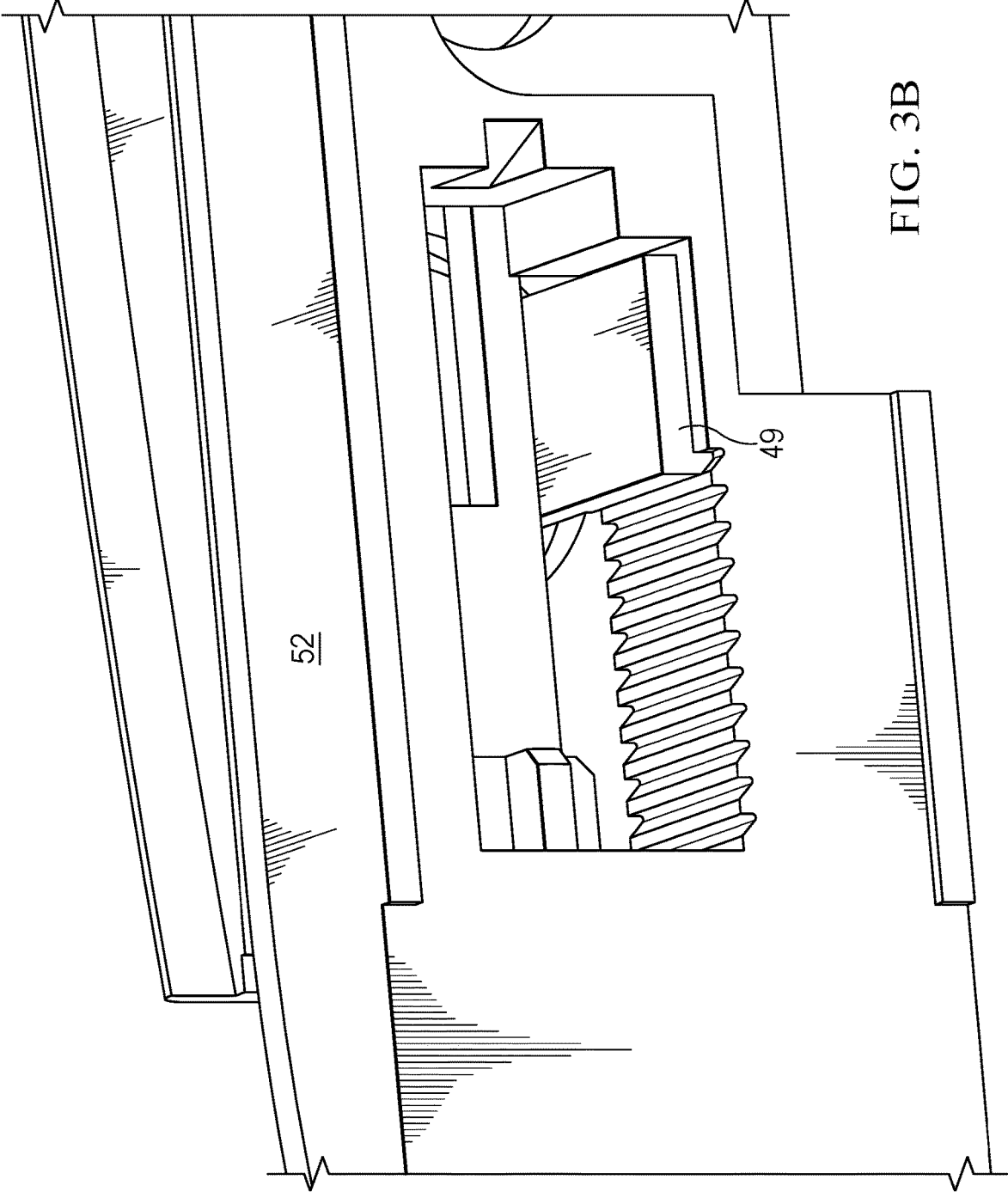

Referring now to FIGS. 3A and 3B, a latch 44 and release catch 49 are depicted configured to manage headband position settings. A geared member 52 controls extension and retraction of earcup straps at the headband as shown in greater detail in FIG. 4 and integrates release catch 49. A downward press on button 42 moves latch 44 away from release catch 49 so that a normal (90 degree) side is removed from engagement with a ridge of release catch 49. A beveled (45 degree) side 46 works against the ridges of release catch 49 so that a sideways pressure against geared member 52 overcomes the beveled engagement of beveled side 46 and release catch 49 to allow movement without a press of button 42.

Figure 4:
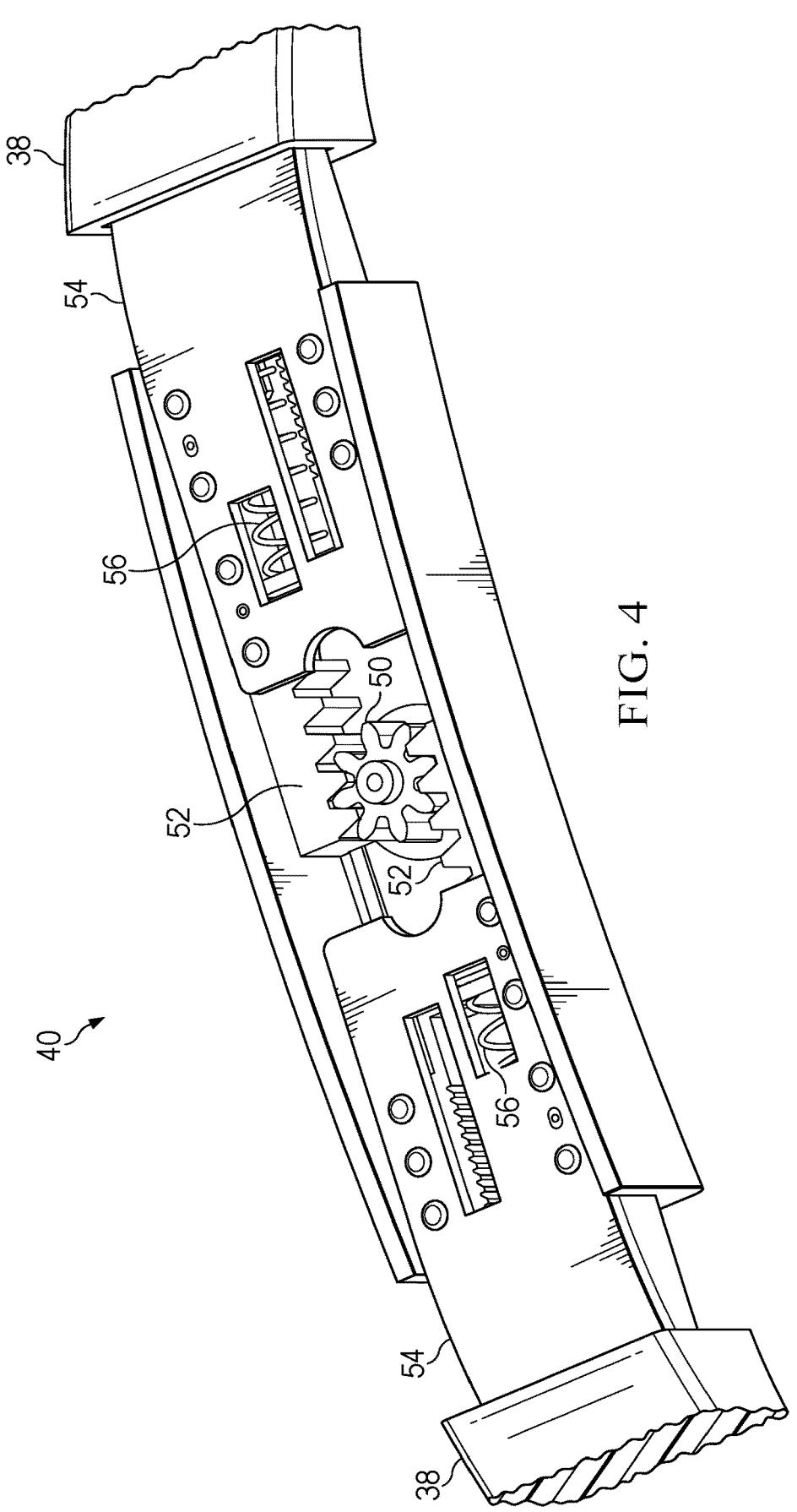
FIG. 4 depicts an upper perspective view of the headset headband having an upper cover of the headband removed.

Referring now to FIG. 4, an upper perspective view depicts the headset 26 headband 40 having an upper cover of the headband removed. In the example embodiment, strap assembly 38 couples an internal strap 54 to a geared member 52, such as with heat stakes. A circular gear 50 in a middle position of headband 40 engages first and second geared members 52 in a rack and pinion assembly so that rotation of circular gear 50 in a first direction extends straps 54 and rotation in a second direction retracts straps 54. First and second compression springs 56 compress when straps 54 retract into headband 40 and bias straps 54 towards an extend position. As described above with respect to FIGS. 3A and 3B, when button 42 is pressed to disengage from release catch 49, compression springs 56 help to bias straps 54 outward. When straps 54 are pressed inward to retract into headband 40, compression spring 56 is compressed and held in place by release catch 49 without a press of button 42 necessary for the retraction due to the beveled side 46 of latch 44. The rack and pinion mechanism, defined by circular gear 50 and geared members 52, provides synchronized movement of straps 54.

Figure 5:
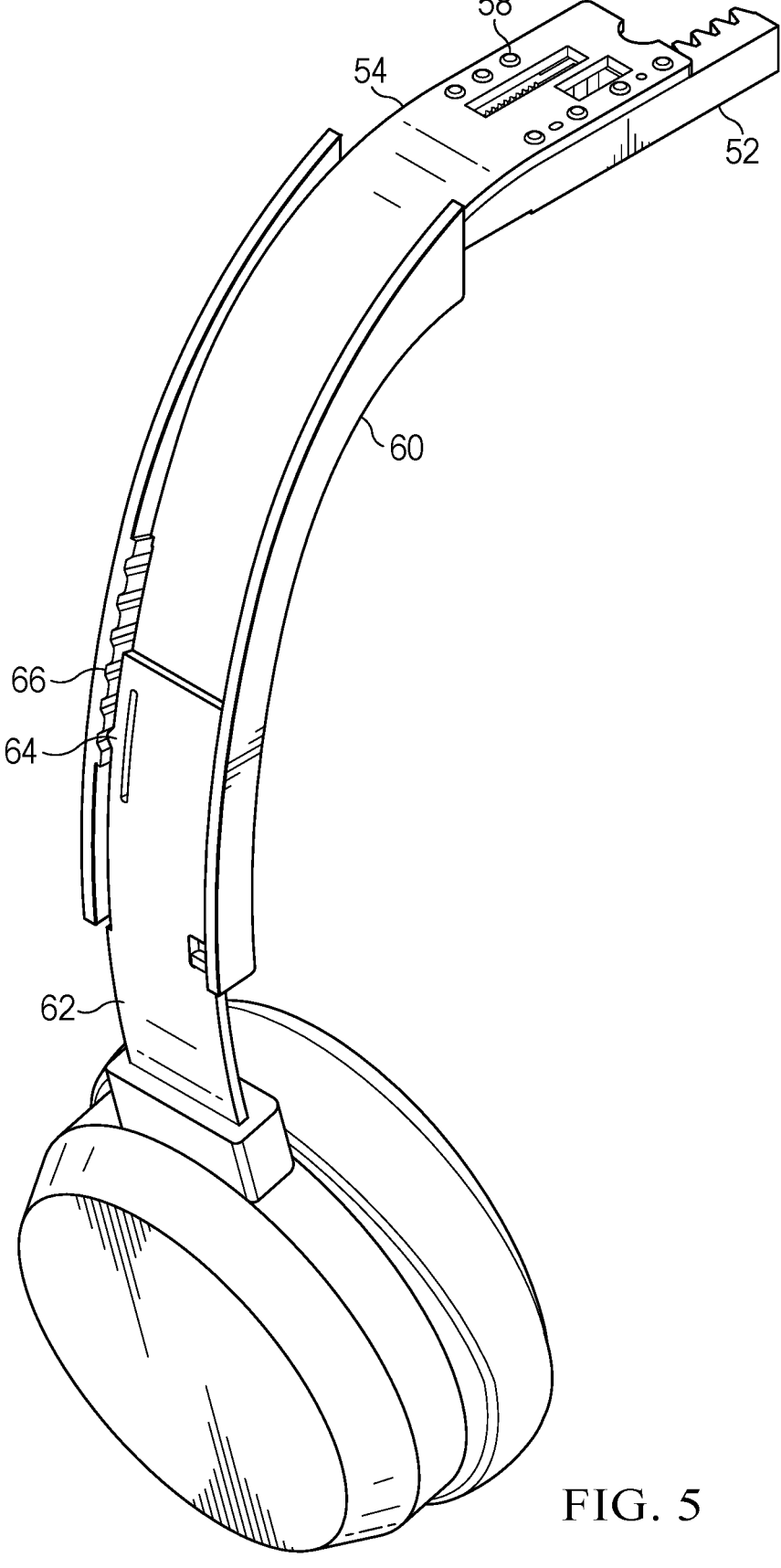
FIG. 5 depicts an upper perspective view of an earcup and strap assembly that adjusts earcup vertical and horizontal positions.

Referring now to FIG. 5, an upper perspective view depicts an earcup and strap assembly that adjusts earcup vertical and horizontal positions. Strap 54 couples to geared member 52 with heat stakes 58 and fits into a guide 60 in a fixed manner. As is described above, headband retraction and extension of strap 54 normal to the orientation of the earcup adjusts the width between opposing earcups. An earcup strap 62 slides within guide 60 to adjust the vertical height of the earcup relative to the headband position. An engagement feature 64 of earcup strap 62 holds a selected vertical height by engaging with notches 66 formed in the side surface of guide 60. The separate vertical and horizontal adjustment mechanisms for positioning of the earcup offers an end user an opportunity to fine tune a headset fit.

Figure 6:
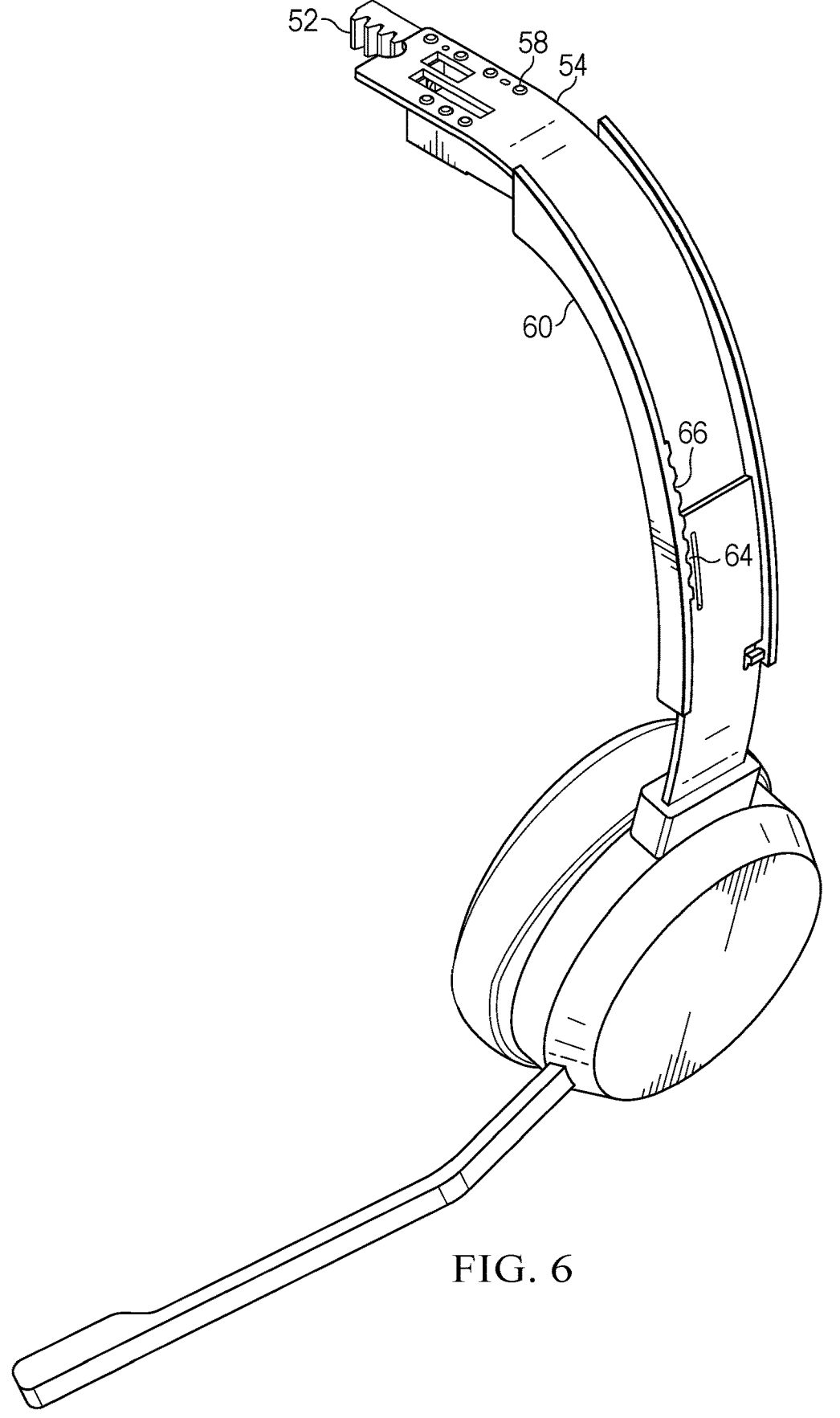
FIG. 6 depicts an upper perspective view of an earcup and strap assembly with a microphone that adjusts earcup vertical and horizontal positions.

Referring now to FIG. 6, an upper perspective view depicts an earcup and strap assembly with a microphone that adjusts earcup vertical and horizontal positions. As with the non-microphone side shown in FIG. 5, geared member 52 couples with heat stakes 58 to strap 54 that is fixed to guide 60 so that extension and retraction of strap 54 in the headband adjusts earcup width. Engagement feature 64 of earcup strap 62 engages with notches 66 to hold the earcup in a selected vertical position. Synchronized motion of gear member 52 with the gear member of the opposing earcup side provides a comfortable and adjusted fit. Earcup height on each earcup side adjusts independently to help with microphone positioning.

Figure 7:
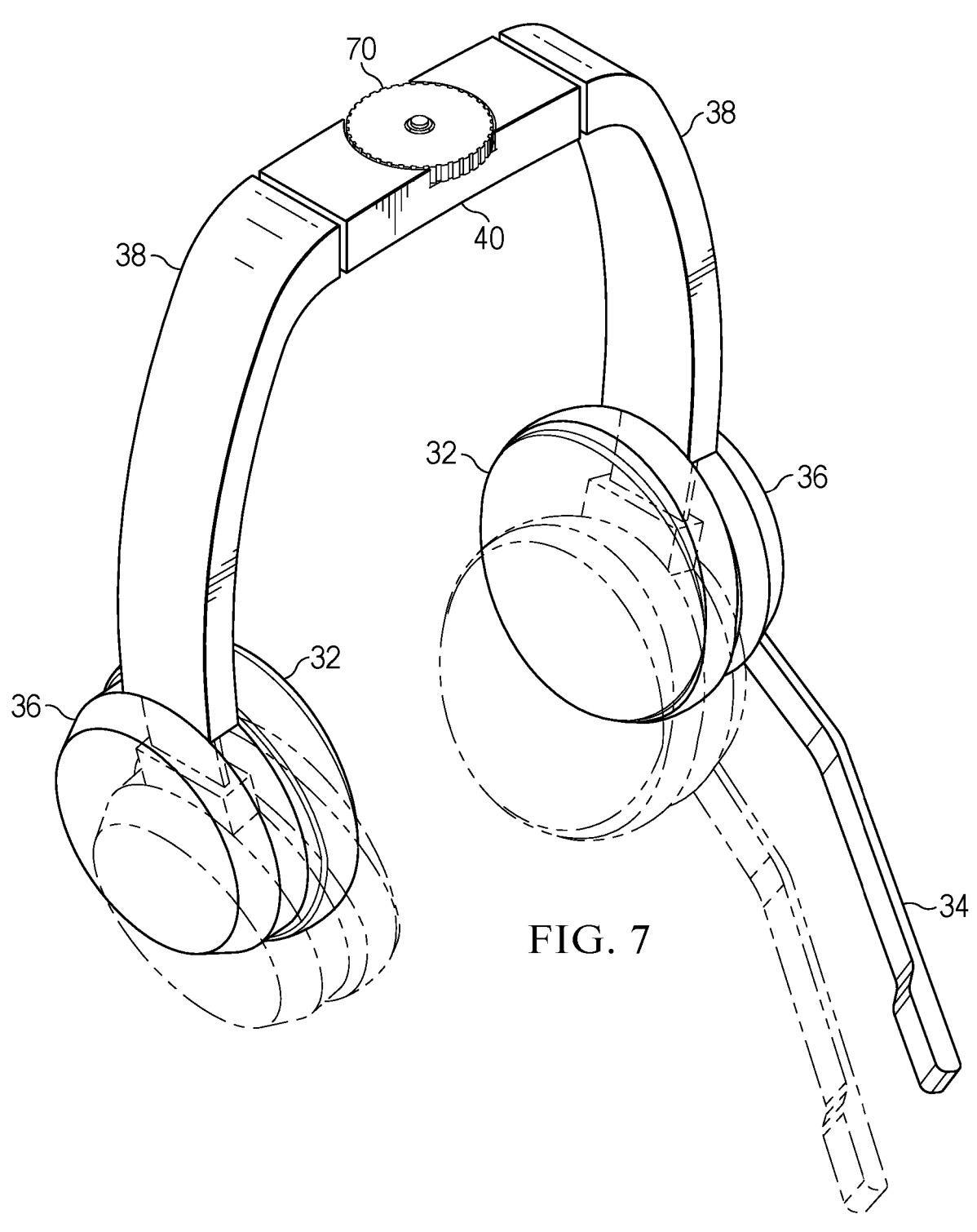
FIG. 7 depicts an upper perspective view of an alternative embodiment of a headset having earcup width adjustment set by a wheel exposed at the headband.

Referring now to FIG. 7, an upper perspective view depicts an alternative embodiment of a headset having earcup 36 width adjustment set by a wheel 70 exposed at the headband 40. Each strap assembly 38 couples through a strap with headband 40 so that rotation of wheel 70 extends and retracts the strap, resulting in an adjustment of the width at which earcups 36 are held apart. Adjusting the width between earcups 36 helps to set the earcups 36 in plane with an end user head without excessive rotation of the earcup so that a good seal is provided to play sound from speakers 32. Independent vertical adjustment of each earcup 36 also enhances alignment of earcups 32 with end user ears.

Figure 8:
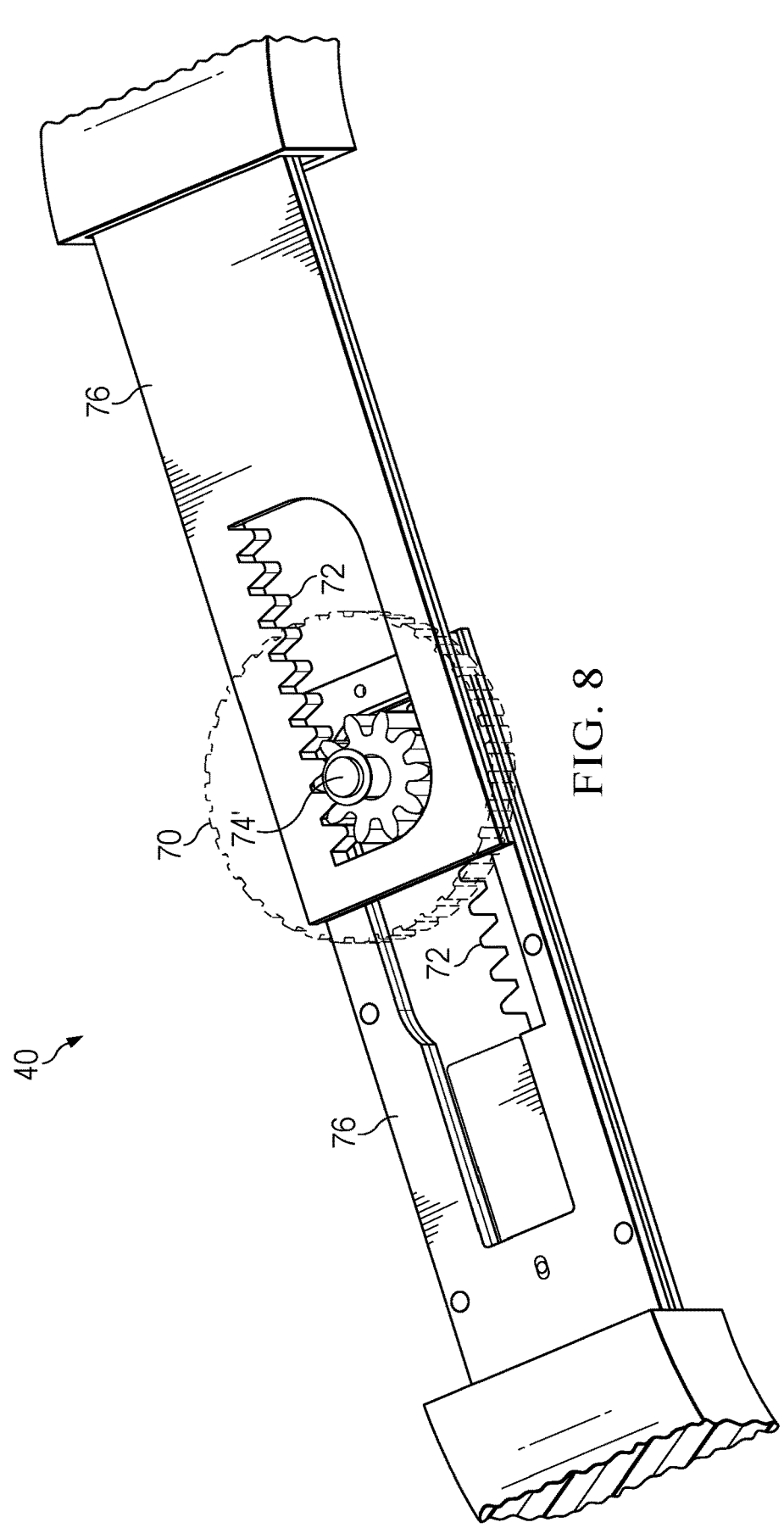
FIG. 8 depicts an upper perspective view of the wheel adjustment mechanism with the headband cover removed.

Referring now to FIG. 8, an upper perspective view depicts the wheel 70 adjustment mechanism with the headband 40 cover removed. Straps 76 couple in a fixed manner to each strap assembly and to a geared member 72 on each side of headband 40 so that an inner circular gear on the bottom of wheel 70 engages with teeth of both geared members 72 for synchronized extension and retraction of straps 76 from headband 40 in response to rotation of wheel 70 about a central axis pin 74. Wheel 70 offers an end user a physical interface to grasp and manipulate for adjusting earcup width.

Figure 9:
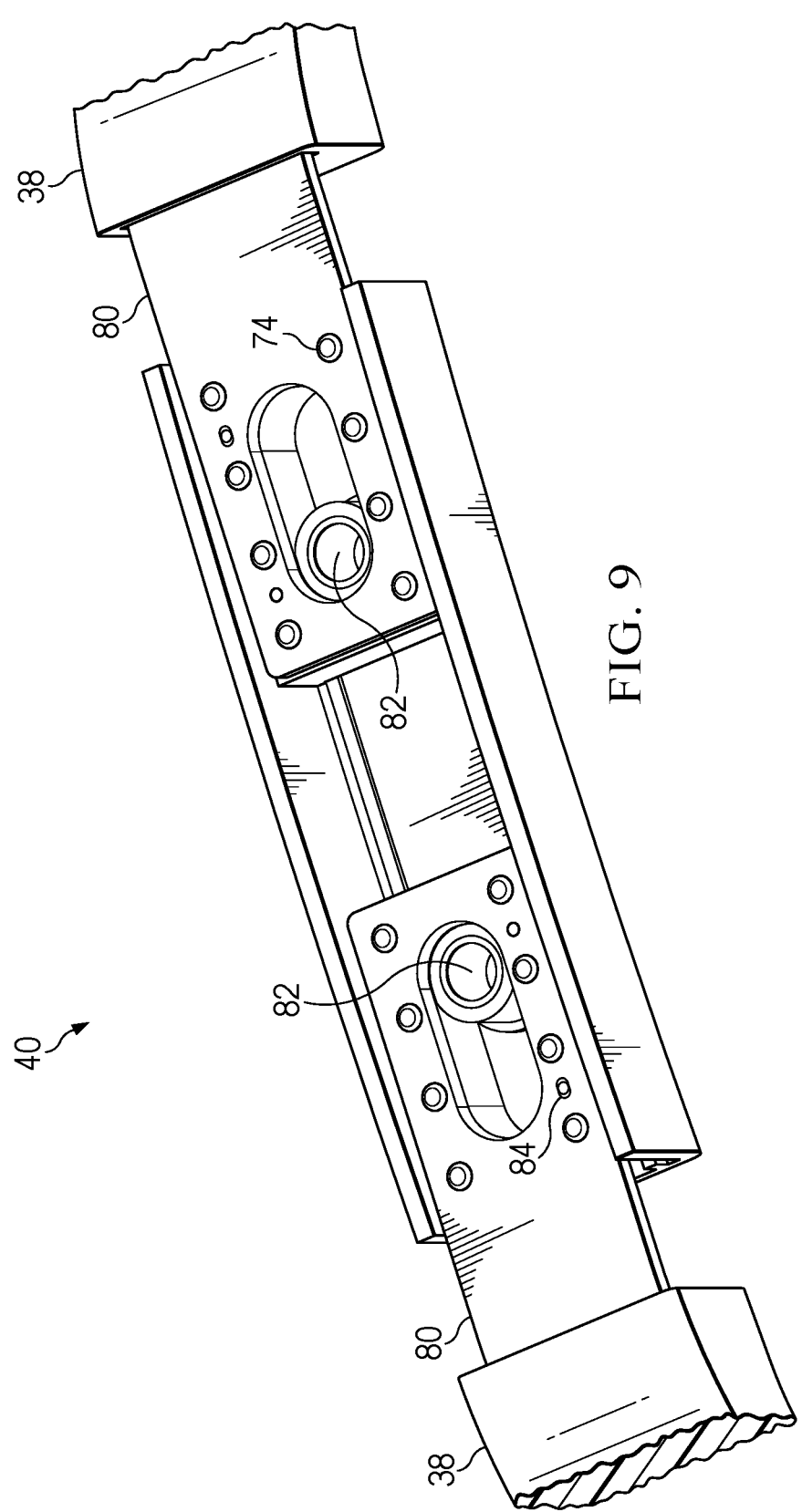
FIG. 9 depicts an upper perspective view of a friction ring adjustment mechanism with the headband cover removed.

Referring now to FIG. 9, an upper perspective view depicts a friction ring adjustment mechanism with the headband cover removed. Straps 80 fixedly couple to strap assembly 38 and a friction ring housing 84 disposed in headband 40. Pressure pushing or pulling on straps 80 work to move friction ring housing 84 relative to friction ring 82. Friction between friction ring housing 84 and friction ring 82 tends to maintain straps 80 is a selected position yet is overcome by sufficient force to allow earcup width adjustment. In this example embodiment, straps 80 move independently relative to each other so that the relative width setting for each earcup may be different. For instance, an end user might want to independently vary earcup width and height to adjust the position of the microphone one side while minimizing tilt misalignment for each earcup when sealed against the end user head.

Although the present invention has been described in detail, it should be understood that various changes, substitutions and alterations can be made hereto without departing from the spirit and scope of the invention as defined by the appended claims.

What is claimed is:

1. An information handling system comprising:
   a processor operable to execute instructions that process information;
   a memory interfaced with the processor and operable to store the instructions and information;
   an audio processor operable to further process the information as audible sounds at a speaker; and
   a headset interfaced with the audio processor and having a first earcup coupled to a first strap in a first earcup plane and a second earcup coupled to a second strap in a second earcup plane parallel to the first earcup plane, the first and second earcups having an earcup orientation to cover first and second ears of an end user with the first earcup aligned in the first earcup plane and the second earcup aligned in the second earcup plane, the first and second straps engaged with a headband configured to extend and retract the first and second straps substantially normal the earcup orientation, the headband having a button extending down from an upper surface and biased to an upward position, the upward position holding the first and second straps in position, the button pushing downward to release the first and second straps.

2. The information handling system of claim 1 further comprising:
   a gear disposed in the headband and engaged with the first and second straps;
   wherein the gear synchronizes extension and retraction of the first and second straps.

3. The information handling system of claim 2 wherein the headband further comprises a wheel exposed at an upper surface and interfaced with the first and second straps, the wheel rotating to extend and retract the first and second bands.

4. The information handling system of claim 1 further comprising:
   a first geared member coupled to the first strap;
   a second geared member coupled to the second strap; and
   a gear wheel engaged on a first side with the first geared member and on a second side with a second geared member, rotation of the gear wheel in a first direction extending the first and second straps, rotation of the gear wheel in a second direction retracting the first and second straps.

5. The information handling system of claim 4 further comprising a button extending down from an upper surface of the headband to selectively engage and release the first geared member.

6. The information handling system of claim 5 wherein the button comprises a latch having a first side with a first shape and a second side with a second shape, the latch engaged with a release catch of the first geared member, the latch having a first side working against extension of the first strap and a second side working against retraction of the first strap.

7. The information handling system of claim 6 wherein:
the latch first side has normal surface relative to the release catch; and
the latch second side has a beveled surface relative to the release catch, the beveled surface configured to release the first strap to retract in response to a predetermined retraction force.

8. The information handling system of claim 7 further comprising a compression spring engaged with the first geared member to bias the first strap towards extension.

9. The information handling system of claim 1 wherein the headband further comprises first and second friction rings engaged with the first and second bands to selectively hold a position of the first and second bands.

10. A method for adjusting a headset fit, the method comprising:
coupling first and second earcups to a headband with first and second straps;
adjusting height of the first and second earcups by adjusting the coupling of the first and second straps to vertically move relative to the headband; and
adjusting a distance between the first and second earcup by adjusting the coupling of the first and second straps to the headband in a direction normal to the plane of orientation of the first and second earcups to horizontally move relative to the headband, the adjusting normal to the plane of the orientation of the first and second earcups performed independent of adjusting of height of the earcups in the plane of the orientation of the first and second earcups, the headband having a button extending down from an upper surface and biased to an upward position, the upward position holding the first and second straps in position, the button pushing downward to release the first and second straps.

11. The method of claim 10 further comprising:
reducing the distance by pushing the straps towards the headband to overcome a latch engaged against a catch, the latch having beveled engagement in the direction of reducing distance; and
increasing the distance by pushing a button to release the latch from engagement with the catch, the latch having normal engagement in the direction of increasing distance.

12. The method of claim 10 further comprising synchronizing movement of the first and second straps with a rack and pinion assembly included in the headband and interfaced with the first and second straps.

13. The method of claim 10 further comprising:
exposing a wheel at the headband; and
translating rotation of the wheel to extend and retract the first and second straps at the headband.

14. The method of claim 10 further comprising biasing the first and second straps against extension and retraction with first and second friction rings included in the headband.

15. The method of claim 10 further comprising playing audible sounds with first and second speakers disposed in the first and second earcups.

16. A headset comprising:
a first earcup coupled to a first strap, the first earcup in a first plane aligned to fit over a first end user ear;
a second earcup coupled to a second strap, the second earcup in a second plane aligned to fit over a second end user ear, the first and second planes parallel to each other; and
a headband engaged with the first and second straps and configured to extend and retract the first and second straps substantially normal the first and second planes with horizontal movement independent of a vertical movement within the first and second planes to raise and lower the first and second straps, the headband having a button extending down from an upper surface and biased to an upward position, the upward position holding the first and second straps in position, the button pushing downward to release the first and second straps.

17. The headset of claim 16 further comprising:
a first geared member coupled to the first strap;
a second geared member coupled to the second strap; and
a gear wheel engaged on a first side with the first geared member and on a second side with a second geared member, rotation of the gear wheel in a first direction extending the first and second straps in a synchronized manner, rotation of the gear wheel in a second direction retracting the first and second straps in the synchronized manner.

18. The headset of claim 17 further comprising:
a button extending down from an upper surface of the headband to selectively engage and release a latch of the button with the first geared member; and
a release catch coupled to the first geared member and aligned to engage with the latch, the latch having a first side working against extension of the first strap and a second side working against retraction of the first strap.

19. The headset of claim 18 wherein:
the latch first side has normal surface relative to the release catch and configured to engage the release catch until the button is pressed; and
the latch second side has a beveled surface relative to the release catch, the beveled surface configured to release the first strap to retract in response to a predetermined retraction force.

20. The headset of claim 19 further comprising a compression spring engaged with the first geared member to bias the first strap towards extension.

* * * * *